Figures 1, 2, 3:
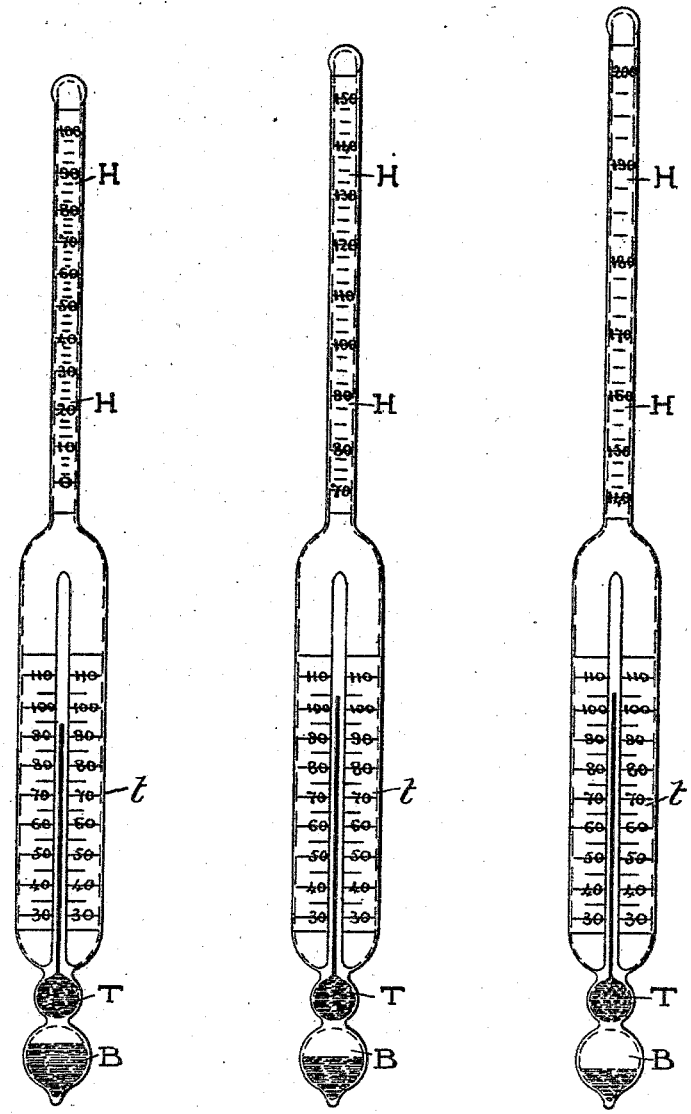

(No Model.)

H. GUTH.
HYDROMETER FOR LIGHT AND HEAVY LIQUIDS.

No. 301,444. Patented July 1, 1884.

WITNESSES: Herbert W. T. Jenner.
Walter J. Watson.

Henry Guth INVENTOR

UNITED STATES PATENT OFFICE.

HENRY GUTH, OF NEW YORK, N. Y.

HYDROMETER FOR LIGHT AND HEAVY LIQUIDS.

SPECIFICATION forming part of Letters Patent No. 301,444, dated July 1, 1884.

Application filed January 22, 1884. (No model.)

*To all whom it may concern:*

Be it known that I, HENRY GUTH, a citizen of the United States, residing at the city of New York, in the county of New York and State of New York, have invented certain new and useful Improvements in Hydrometers for Light and Heavy Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and which drawings represent the instruments at about half the actual and most convenient size.

The ordinary method of making the necessary corrections for temperature is open to the objection that the thermometer is not placed in the same part of the liquid in which the instrument floats, so that when the temperature of the vessel used, or of the surrounding air, is different from that of the liquid poured in, the thermometer will give an indication different from the true temperature of that part of the liquid which floats the hydrometer, and from which the correction ought to be deduced. This difference may be one to two degrees and even more, which, when large amounts of spirits have to be estimated, according to sample, results in a considerable difference and injustice to the parties concerned.

My invention relates to an improvement in hydrometers, and involves the general configuration of the lactometers described and claimed in an application filed by me simultaneously herewith; and it consists of certain details of construction hereinafter described and claimed.

In order to obtain the correct temperature of the liquid tested, I make the ball of the thermometer part and parcel of the weight ballasting the hydrometer, not alone, but place it outside the hollow portion which floats the instrument, so that it is in full contact with the liquid. This is the most essential and principal part of my claim, as I am well aware that attempts have been made to place thermometers inside the hydrometers; but they were not in immediate contact with the liquid, and therefore could not indicate its true temperature, except after waiting considerable time to allow the heat of the liquid to radiate through the air-space, which for the ordinary low temperature is a very slow process. For small instruments the thermometer-ball may be the only weight necessary to ballast the instrument, of which the wider portion contains the scale for the degrees of heat, while the stem above contains the scale of specific gravity or of the degrees of strength of the liquid; but I find it more practical not to make the instrument so small, but large enough to require an additional ballast-weight of mercury under the thermometer-bulb, and this is the way in which the instruments for the gaging of spirits are constructed, represented in the adjoined drawings, in which—

Figure 1 represents the hydrometer for spirits from water = 0 until proof-spirits = 100; Fig. 2, the hydrometer for spirits slightly below or above proof, or from 70 to 150; and Fig. 3, the hydrometer for alcohol from 140 to 200, which latter is absolute alcohol.

B represents the ballasting-bulb; T, the thermometer-ball, of which the scale is seen in $t$ immediately above, and indicating degrees from 20° or 30° to 100°. The tube H H on top contains the hydrometer-scale, indicating the percentage of alcohol, while the thermometer-scale below, being observed at the same time, shows what correction for temperature has to be made, according to the tables published by the United States Government.

It is evident that my method applies as well to hydrometers for heavier liquids as to those here represented, and which serve exclusively for liquids lighter than water, especially for alcoholic spirits.

What I claim, and wish to secure by Letters Patent, is—

A hydrometer for spirits, with two ballasting-balls both in direct contact with the liquid, and of which balls the upper one performs the additional function of a thermometer, with its scale attached, and placed in the wider submerged portion of the instrument, while the stem above carries the scale of specific gravity.

In testimony whereof I affix my signature in presence of two witnesses.

HENRY GUTH.

Witnesses:
GRANT UYER,
T. SHERMAN.